[19] United States Patent
Bestenreiner et al.

[11] 3,984,187
[45] Oct. 5, 1976

[54] SCANNING AND REPRODUCTION OF PICTORIAL IMAGES

[75] Inventors: Friedrich Bestenreiner, Grunwald; Josef Helmberger; Reinhold Deml, both of Munich, all of Germany

[73] Assignee: AGFA-Gevaert, A.G., Leverkusen, Germany

[22] Filed: Feb. 13, 1975

[21] Appl. No.: 549,683

[30] Foreign Application Priority Data
Feb. 20, 1974  Germany............................ 2408019

[52] U.S. Cl. .................................... 355/80; 355/20; 355/68; 355/83; 355/132
[51] Int. Cl.² ........................................ G03B 27/76
[58] Field of Search ................. 355/80, 132, 20, 67, 355/68, 83

[56] References Cited
UNITED STATES PATENTS

| | | | |
|---|---|---|---|
| 2,985,086 | 5/1961 | Craig | 355/80 X |
| 3,115,807 | 12/1963 | Craig et al. | 355/20 |
| 3,177,764 | 4/1965 | Akima | 355/20 X |
| 3,183,766 | 5/1965 | Takasaka et al. | 355/20 |

*Primary Examiner*—R. L. Moses
*Attorney, Agent, or Firm*—Michael J. Striker

[57] ABSTRACT

An original bears a pictorial image, or the like. The original is illuminated with first and second light and the image on the original is projected onto a copy carrier. The spatial variation of the intensity of the first light after the first light has been modulated in intensity by the image on the original is detected. The contrast of the image projected onto the copy carrier compared to the contrast of the image on the original is changed by changing the spatial variation of the second light in dependence upon the detected spatial variation of the intensity of the modulated first light.

22 Claims, 4 Drawing Figures

SCANNING AND REPRODUCTION OF PICTORIAL IMAGES

BACKGROUND OF THE INVENTION

The invention relates to the scanning and reproduction of originals bearing pictorial images, and the like.

In many photographic copying processes — for example, the production of color-paper images, the duplication of diapositives, the production of color negatives from color positives or the making of black-and-white take-offs from color films — it is necessary or desired to change the gradation of the reproduced image, compared to the gradation of the image on the original. In general what is involved, in effect, is a reduction of the value of the exponent gamma of the characteristic curve. Dark regions should be brightened, and light regions darkened; however, other gradation changes may also be desired in some circumstances.

It is known to use as the light source in such a copying operation a cathode ray tube the spot brightness of which is controlled. The flying spot formed on the image screen of the tube traces a raster, which is projected onto a transparent original. The major portion of the transmitted light is projected by means of image-forming optics onto the light-sensitive material, causing an image-forming chemical reaction. The remainder of the transmitted light is directed onto a photodetector which generates a signal for controlling the intensity of the illuminating flying light beam derived from the flying spot of the cathode ray tube. In this way, the spatial distribution of the density of the transparent image has a controlling effect upon the illuminating light source; this feedback action results in a change of the contrast of the reproduced image compared to the contrast of the image on the original.

With the known system, in consequence of the afore-described feedback, there are formed in the reproduced image a plurality of dark and bright stripes or striations oriented parallel to an edge which runs perpendicular to the scanning direction. The width of these stripes depends upon the propagation-time-dependent phase shift introduced in the electro-optical feedback branch of the system.

SUMMARY OF THE INVENTION

It is the general object of the invention to provide a method, and apparatus for performing the method, such that the undesirable stripes or striations referred to above are not produced.

This object, and others which will become more understandable from the description, below, of specific embodiments, can be met, according to one advantageous concept of the invention, by providing a control circuit for the illumination of the image on the original and a compensation circuit for modifying the spatial variation of the illuminating light in dependence upon the spatial variation of the light modulated by the image on the original. According to the inventive concept, the compensation circuit is de-coupled from the control circuit. The gradation modification is advantageously so performed that in the control circuit, by means of a semitransmissive mirror, a part of the modulated light is coupled out, thereafter filtered by a filter, and then applied to a photodetector. The intensity-indicating signal generated by the photodetector is applied to a compensation circuit comprised of an amplifier and a second light source and is amplified in a manner which modifies the contrast of the reproduced image. The light emitted by the just mentioned second light source is filtered by means of a second filter, complementary to the first filter mentioned above, and is bent by means of a semitransmissive mirror into the main light path of the light which illuminates the image on the original and becomes projected onto the copy carrier.

With the above approach, it is preferred to use as the light source two synchronously controlled cathode ray tubes arranged congruently relative to the image on the original, or else to use a first light source which uniformly and simultaneously illuminates all portions of the image on the original in conjunction with a vidicon and a cathode ray tube for effecting the desired modification of the contrast.

According to a further advantageous concept of the invention, there is performed a uniform first illumination of the image on the original by means of a cathode ray tube. Thereafter, a part of the light modulated by the image on the original is coupled out of the control circuit and the signal for the entire image on the original is stored. During a second illumination of the image, the stored signal is read out, amplified for the purpose of modifying the contrast of the reproduced image, and visually displayed on the screen of the cathode ray tube. The light image on the cathode ray tube is used as illuminating light having a spatial intensity variation, and this illuminating light supplements the effect of the illuminating light employed during the aforementioned first illumination.

Instead of storing the entire image, it is also possible to perform the detection of the extent to which the first light is modulated by the image on the original, and the compensating illumination using second light, during the tracing of alternate scan lines of the cathode-ray-tube light source. With this approach, the intensity-indicating signal furnished by the photodetector is caused to be delayed by a time interval equal to the time interval required for the tracing of one scan line.

In the latter case, it is advantageous if the first light is of such intensity that the light reaching the copy carrier during the tracing of the first scan lines has no effect or only a negligible effect upon the copy carrier, e.g., photographic paper, with the intensity-indicating signal of the light detector being delayed by the time interval required for the tracting of one scan line and being used during the tracing of the next scan line for controlling the intensity of the illuminating beam derived from the flying spot on the image screen of the cathode ray tube. With this approach, it is advantageous to connect the spot-brightness control input of the cathode ray tube alternately to the output of a suitable time-delay stage and to the output of a source of constant voltage, for example by means of an electronic switchover stage activated at the scanning line frequency.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
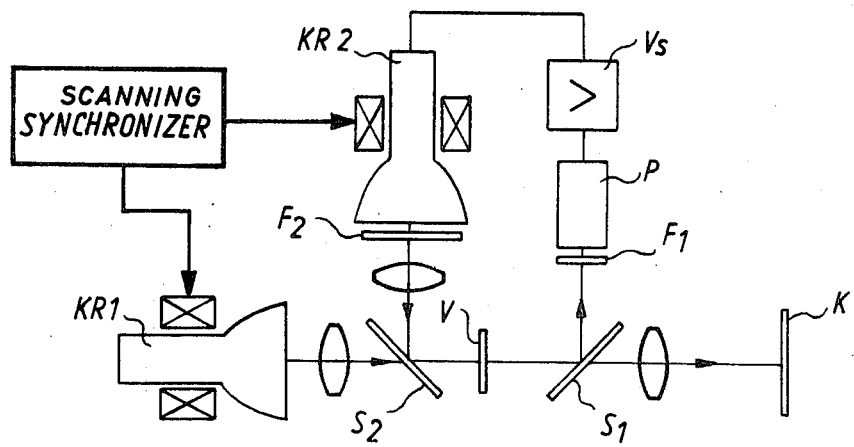
FIGS. 1–4 depict four different inventive systems which can be employed to perform four different versions of the inventive method.

FIG. 1 depicts schematically a first embodiment of the inventive contrast control arrangement. For the sake of clarity, the optical systems present to form the requisite images are shown only very schematically in the drawing. A first cathode ray tube KR1 is employed as a point-light-source scanning tube. It displays upon its image screen, in per se known manner, a scanning raster of uniform light intensity. By means of schematically, illustrated optics, this scanning raster is projected onto the original V to be copied. The original V can for example be a transparent diapositive or a negative. An image of the original V itself is in turn projected, by means of further schematically illustrated optics, onto the copy bearer K, which can for example be ordianry photographic paper. A beam splitter S1 is arranged in the main path of the light intermediate cathode-ray-tube light source KR1 and copy bearer K. Part of the light travelling along this main light path from the light source KR1 to the beam splitter S1 is deflected out of the main light path and directed onto the cathode of a photoelectric detector P. Intermediate the photo-electric detector P and the beam splitter S1 there is arranged a filter F1. This filter can, for example, be a color filter or a polarization filter.

The electrical signal generated by the photoelectric detector P corresponds to the modulation by the original V of the light originating from light source KR1 and passing through the original V. This electrical signal is applied to a variable-gain amplifier $V_s$, and then in amplilfied form is applied to the conventional electron-beam-intensity control electrode of a second cathode ray tube KR2. The gain furnished by the amplifier $V_s$ influences the contrast in the image ultimately formed on copy bearer K.

The front of the image screen of the cathode ray tube KR2 there is arranged a second filter F2 which is complementary to the first filter F1. If the filters are polarization filters, the polarization axes of the filters F1, F2 are crossed relative to each other; if the filters are color filters, the filters are of complementary colors.

The image appearing on the screen of the second cathode ray tube KR2, by means of schematically illustrating optics, is projected towards a second beam splitter S2, which deflects the image back into the main light path extending from the light source KR1 to copy bearer K. More accurately, at any given moment, the point of light appearing on the screen of tube KR2, by means of nonillustrated optics, is projected, in the form of a light beam, towards the second beam splitter, which deflects the beam back into the main light path. The $x$ and $y$ deflection control circuitry for the two cathode ray tubes KR1, KR2 is synchronized. This is schematically indicated in FIG. 1 by the presence of the so-called scanning synchronizer. It will be understood that the $x$ and $y$ deflection signals applied to the $x$ and $y$ deflection coils of one cathode ray tube are simultaneously applied to the deflection coils of the other cathode ray tube. In this way, the flying spots formed on the image screens of the two tubes trace respective rasters in synchronism with each other. Likewise, the illustrated optics derives from the two synchronized flying light spots corresponding flying light beams which are projected towards the original V exactly coincident with each other.

Because the two filters F1, F2 are complementary to each other, the light originating from the screen of light source KR2 and passing through original V cannot reach the photoelectric detector P. Accordingly, this has no effect upon the compensation or feedback circuit P, $V_s$, KR2. As a result, a feedback action involving this light component and the associated formation of a striated image do not occur.

Figure 2:
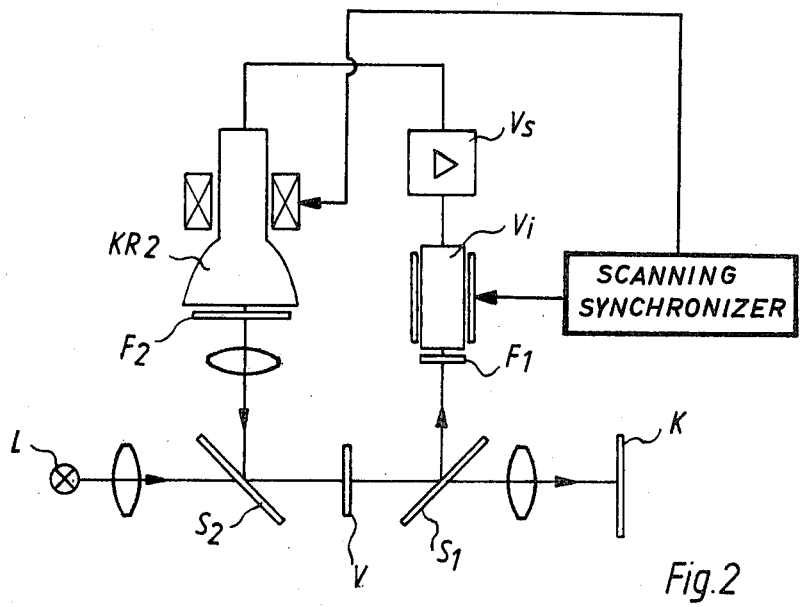

FIG. 2 depicts a second embodiment of an arrangement for performing the inventive method. In the embodiment of FIG. 2, a conventional light source L and a vidicon $V_i$ respectively replace the cathode-ray-tube point-light-source KR1 and photoelectric detector P of the embodiment shown in FIG. 1. In the embodiment of FIG. 2, as in that of FIG. 1, a contrast-controlling light image is produced on the screen of the cathode ray tube KR2, and this contrast-controlling light is deflected by beam splitter S2 and transmitted through the original V to the copy bearer K. The videa signal output of the vidicon $V_i$ is depicted connected to the input of amplifier $V_s$. The $x$ and $y$ deflection coils of the cathode ray tube KR2 and of the electron beam scanning device in the vidicon are operated in synchronism with each other, schematically as indicated in FIG. 2 by the presence of the scanning synchronizer. Accordingly, the charge-density image formed on the photoconductive surface of the vidicon is scanned in synchronism with the tracing of a raster by the flying spot on the image screen of cathode ray tube KR2.

Figure 3:
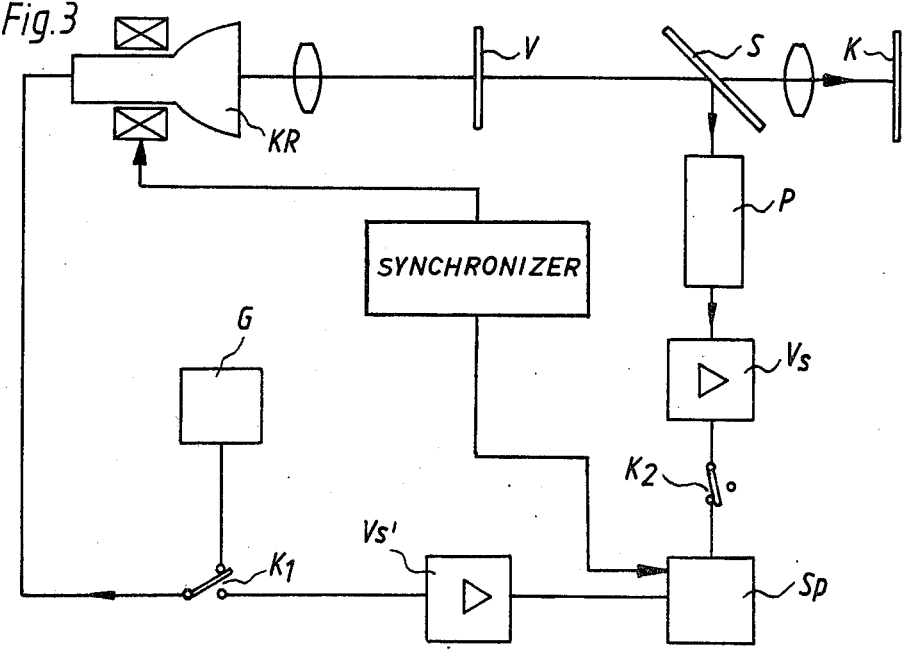

FIG. 3 depicts a third inventive arrangement for performing the inventive method. A constant D.C. voltage is applied to the electron-beam-intensity control input of the cathode ray tube KR, resulting in the production of an unmodulated, uniform-intensity scanning raster on the screen of the tube. This unmodulated light raster is projected, by means of schematically illustrated optics, through the transparent original V, and becomes modulated as a result. The thusly modulated light beam is in part deflected by beam splitter S out of the main light path and directed onto the photoelectric surface of a photoelectric detecotr P. The latter generates a corresponding electrical signal which is then amplified by amplifier $V_s$ and transmitted to storage device $S_p$. The storage device $S_p$ stores the values of the videa signal for the entire image of the original V.

Thereafter, the spot-brightness control input of the cathode ray tube is connected to the output of an amplifier $V_s'$, the input of which is connected to the output of the storage device $S_p$. As a result, the modulated light raster now appears on the image screen of the cathode ray tube KR, and the light of this contrast-controlling modulated light raster is projected through the original V onto the copy bearer K. The amplifier $V_s$ and/or the amplifier $V_s'$ is a variable-gain amplifier, to permit variation of the contrast of the image formed on the copy bearer K.

The exposure of the copy bearer K to light can be performed in two steps. In the first step, light from the unmodulated, uniform-intensity light raster on the screen of tube KR is projected through the original V and registered by the storage device $S_p$. Some of the light passing through the original V will also fall upon the copy bearer K, producing an image having unmodified contrast. In the second step, the modulated light raster on the screen of tube KR is projected through the original V and onto the copy bearer K, producing an image having modified contrast. During this second step, the beam splitter S can be removed, if desired.

To switch over from the first to the second step use is made of a set of switches K1, K2. During the first step, the switch K1 applies the constant D.C. voltage furnished by a D.C. voltage source G to the electron-beam-intensity control electrode of the cathode ray tube KR, the switch K2 connects the output of the photoelectric detector P to the input of the storage device $Sp$. During the second step, the switch K1 connects the output of storage device $Sp$ to the electron-beam-intensity control electrode of the cathode ray tube KR, through the intermediary of the amplifier $Vs'$, whereas the switch K2 disconnects the output of amplifier $Vs$ from the input of storage device $Sp$.

The first step can be performed in such a manner that the light projected from the unmodulated light raster on the screen of tube KR and passing through the original V has so low an intensity as to be detected by the photoelectric detector P, while not having any appreciable effect upon the copy bearer K, for example photographic paper.

The storage device $Sp$ can for example be a plate storage device, a drum storage device or a storage tube. Whatever the form of the storage device $Sp$, it is to be understood that the orderly write-in of information and the orderly read-out of information are synchronized with the tracing of a light raster by the flying spot on the image screen of the cathode ray tube KR. This is schematically indicated in FIG. 3 by the presence of a synchronizer. For example, if the storage device $Sp$ is a storage tube the $x$ and $y$ deflection control signals applied to the deflection control circuitry of the cathode ray tube KR can also be applied to the deflection unit of the storage tube for use as synchronizing signals, both during the recording of a video signal and during playback of the recorded video signal.

Figure 4:
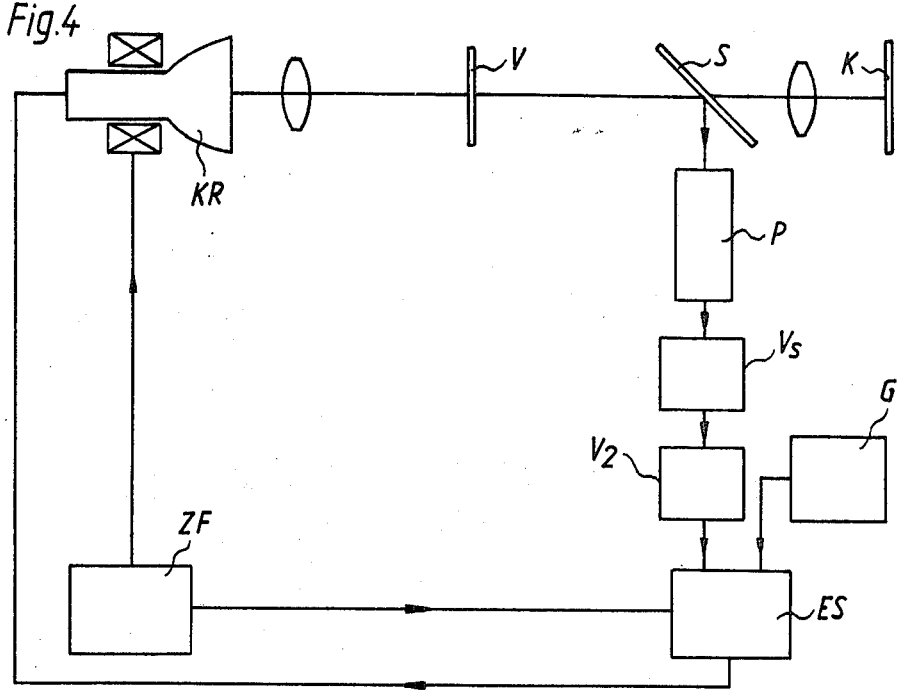

FIG. 4 schematically depicts a fourth inventive arrangement for performing the inventive method. The main light path is the same as in FIG. 3. However, instead of the storage device $Sp$, use is made of a time delay stage V2, exhibiting a time delay equal to the time required for the scanning of one line during the cathode-ray-tube scanning operation. The time-delay stage $Vz$ can for example be a delay line, a delay-line network, a bucket-brigade-type storage device (see for example "Electronics", Feb. 28, 1972, Laurence Altman: "Bucket brigade devices . . . "), or the like.

An electronic switch ES, operating with the line frequency of the scanning cycle, and switched simultaneously with the deflecting arrangement of the cathode ray tube, alternately connects the time-delay stage $Vz$ and a D.C. voltage source G with the electron-beam-intensity control electrode of the cathode ray tube. The electronic switching device ES can for example comprise two gates, each having a first input and a second input, and a flip-flop having a toggle or complementing input and two outputs. The first input of the first gage would be connected to the output of D.C. voltage source G, and that of the second gate to the output of delay stage $Vz$. The second input of the first gate would be connected to the first output of the flip-flop, while that of the second gate would be connected to the second output of the flip-flop. The toggle or complementing input of the flip-flop would be connected to the illustrated line-frequency control circuit ZF. The outputs of the two gates would be connected to the two inputs of an OR-gate, the output of which would constitute the output of stage ES. The line-frequency control circuit ZF, very conveniently, can be part of the control signal generator which controls the deflection of the electron beam of the cathode ray tube KR. For example, if horizontal synch pulses are applied to the deflection control circuit of the cathode ray tube control circuitry, such synch pulses can be simultaneously applied to the control input of switching circuit ES, to active the latter at the scanning line frequency.

In this embodiment too, the applied D.C. voltage can be selected so low that the light from the light raster on the tube screen, after passing through the original V, is of sufficient intensity to be properly detected by the photoelectric detector P, while being of too low an intensity to have an appreciable effect upon the copy bearer K, for example photographic paper.

The inventive method and the inventive apparatuses for its performance are also suitable for additive color copying processes, with the steps for each of the three primary colors being performed successively. In this event, in the embodiments shown in FIGS. 1 and 2, the use of complementary polarization filters is preferred over the use of complementary color filters.

It will be understood that each of the elements described above, or two or more together, may also find a useful application in other types of circuits and constructions differing from the types described above. While the invention has been illustrated and described as embodied in a printer which prints onto photographic paper, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a method of scanning originals bearing pictorial images, and the like, and reproducing such images, in combination, the steps of illuminating an original with first and second light and projecting the image of the original onto a copy carrier; detecting the spatial variation of the intensity of the first light after the first light has been modulated in intensity by the image on the original; and changing the contrast of the image projected onto the copy carrier compared to the contrast of the image on the original by changing the spatial variation of the intensity of the second light in dependence upon the detected spatial variation of the intensity of the modulated first light, wherein said illuminating step comprises illuminating the original with a first and with a second light source, respectively producing said first and second light, wherein said detecting step comprises deflecting light which has been modulated by the image on the original and which is being projected towards the copy carrier away from the copy carrier and projecting such deflected light onto a light detector through a filter which blocks the second light furnished and using the light detector to generate a light-intensity-indicating electrical signal, and wherein said step of changing the contrast comprises applying the electrical signal to the light-intensity control input of the second light source to control the intensity of the illumination of the image on the original effected by the second light source in dependence upon the detected modulated intensity of the deflected first light.

2. In a method as defined in claim 1, said first light source comprising a first cathode ray tube, said second light source comprising a second cathode ray tube and intermediate the image screen of the latter and the original a filter which passes substantially only light which is blocked by the filter associated with the light detector, and wherein said step of illuminating comprises causing the electron beam of each cathode ray tube to scan a raster and form a flying spot on the image screen of the respective cathode ray tube and deriving from the two flying spots coincident flying light beams, and illuminating the original with the coincident flying light beams.

3. In a method as defined in claim 1, said first light source producing light which illuminates all portions of the image on the original simultaneously, and said second light source comprising a cathode ray tube and intermediate the image screen of the tube and the original a filter which passes substantially only light which is blocked by the filter associated with the light detector, said light detector comprising a vidicon located back of the associated filter, wherein said step of illuminating comprises causing the electron beam of the cathode ray tube to scan a raster and form a flying spot on the image screen of the cathode ray tube and deriving from the flying spot a flying light beam and illuminating the original with the flying light beam, wherein said step of detecting the intensity of the first light comprises scanning the charge density image on the photoconductive surface of the vidicon in synchronism with scanning effected by the electron beam of the cathode ray tube, and wherein said step of changing the contrast comprises applying the video output signal of the vidicon to the spot-brightness control input of the cathode ray tube.

4. In a method of scanning originals being pictorial images, and the like, and reproducing such images, in combination, the steps of illuminating an original with first and second light and projecting the image of the original onto a copy carrier; detecting the spatial variation of the intensity of the first light after the first light has been modulated in intensity by the image on the original; and changing the contrast of the image projected onto the copy carrier compared to the contrast of the image on the original by changing the spatial variation of the intensity of the second light in dependence upon the detected spatial variation of the intensity of the modulated first light, wherein said step of illuminating an original comprises effecting a line-by-line scanning of the original with a flying light-beam derived from a flying light spot traced on the image screen of a cathode ray tube, with said first and second light being the light of said flying light beam during the tracing by the latter of alternate respective first and second scan lines, wherein said step of illuminating an original further includes maintaining the intensity of the flying light beam substantially constant during the tracing of each first scan lines, and wherein said step of detecting comprises registering during the tracing of each first scan line the variation with respect to time of the intensity of the light beam as modulated by the image on the original, and wherein said step of changing the contrast comprises applying to the spot-brightness control input of the cathode ray tube during the tracing of each second scan line a control signal which varies in time in correspondence to the light beam intensity variation registered during the tracing of the preceding scan line.

5. In a method as defined in claim 4, wherein said step of detecting comprises using a photoelectric detector operative for generating an electrical signal having an instantaneous value indicative of the instantaneous intensity of the light incident upon the photoelectric detector, and wherein said step of changing the contrast further comprises applying the electrical signal generated by the photoelectric detector to the input of a time-delay device having a time delay equal to the time interval required for the tracing of one scan line and applying the output signal of the time-delay device to the spot-brightness control input of the cathode ray tube during the tracing of each second scan line.

6. In a method as defined in claim 5, said copy bearer comprising light-sensitive material, wherein said step of maintaining the intensity of the flying light beam substantially contrast during the tracing of the first scan lines comprises maintaining such intensity constant at a value such that the portions of the image on the original scanned during the tracing of the first scan lines are projected onto the copy bearer as light images of such low intensity as to have a first effect upon the light-sensitive material of the copy bearer, and wherein said step of detecting further comprises amplifying the electrical signal generated by the photoelectric detector to such an extent that the portions of the image on the original scanned during the tracing of the second scan lines are projected onto the copy bearer as light images of an intensity sufficient to have a second effect upon the light-sensitive material of the copy bearer, and wherein said value and the amplification of the electrical signal are such that said first effect is negligible compared to said second effect.

7. In a method as defined in claim 5, the spot-brightness control input of the cathode ray tube being connected by an electronic switchover device to the output of the time-delay stage and to the output of a D.C. voltage source, wherein said step of illuminating an original, said step of detecting the intensity of the first light, and said step of changing the contrast together comprise activating the electronic switchover device with an activation frequency equal to the line frequency of the scanning raster of the cathode ray tube.

8. An apparatus for scanning originals bearing pictorial images, and the like, and reproducing such images, comprising, in combination, illuminating means operative for illuminating an original with first and second light and projecting the image of the original onto a copy carrier; detecting means operative for detecting the spatial variation of the intensity of the first light after the first light has been modulated in intensity by the image on the original; and contrast-changing means operative for changing the contrast of the image projected onto the copy carrier compared to the contrast of the image on the original by changing the spatial distribution of the intensity of the second light in dependence upon the detected spatial variation of the intensity of the modulated first light, wherein said illuminating means comprises first and second light sources producing said first and second light, said second light source having a light-intensity control input, wherein said detecting means comprises a photoelectric detector, deflecting means operative for deflecting light which has been modulated in intensity by the image on the original and which is being projected towards the copy carrier away from the copy carrier and projecting such deflected light towards said photoelectric detector, and intermediate said deflecting means and said photoelectric detector a filter which blocks the second light, and wherein said contrast-changing means comprises means for applying to the light-intensity control input of said second light source a control signal derived from the output signal of said photoelectric detector.

9. An apparatus as defined in claim 8, wherein said first light source comprises a first cathode ray tube, and wherein said second light source comprises a second cathode ray tube and intermediate the image screen of the latter and the original a filter which passes substantially only light which is blocked by said filter of said detecting means, wherein said illuminating means further comprises synchronizing means for synchronizing the tracing of rasters by the flying spots on the image screens of the two cathode ray tubes and optical means operative for deriving from the two flying spots coincident flying light beams and illuminating the original with the coincident flying light beams.

10. An apparatus as defined in claim 8, wherein said first light source comprises means for illuminating with first light all portions of the image on the original simultaneously, wherein said second light source comprises a cathode ray tube and intermediate the image screen of the latter and the original a filter which passes substantially only light which is blocked by the filter of the detecting means, wherein said illuminating means further comprises scanning control means operative for causing the electron beam of the cathode ray tube to form on the image screen thereof a flying spot which traces a raster and optical means operative for deriving from the flying spot a flying light beam and illuminating the image on the original with the flying light beam, wherein said photoelectric detector comprises a vidicon located behind the filter of the detecting means, wherein said detecting means further comprises means for scanning the charge density image on the photoconductive surface of the vidicon in synchronism with the scanning effected by the flying light beam, and wherein said contrast-changing means comprises means for applying to the spot-brightness control input of the cathode ray tube a contrast-control signal derived from the video output signal of the vidicon.

11. An apparatus as defined in claim 9, wherein in said deflecting means comprises first semitransmissive mirror means located in the path of the light modulated by the image on the original and arranged to transmit part of the modulated light towards the copy carrier and to deflect the remainder of the modulated light towards the photoelectric detector, and wherein said optical means of said illuminating means comprises means for deriving from the flying spot of the second cathode ray tube a second light beam and second semitransmissive mirror means arranged to deflect such second light beam along a path coincident with the light beam derived from the flying spot of the first cathode ray tube, and wherein said means for applying to the light-intensity control input of the second light source a control signal derived from the output signal of the photoelectric detector includes an amplifier connected between the output of the photoelectric detector or and the spot-brightness control input of the second cathode ray tube.

12. An apparatus as defined in claim 10, wherein said deflecting means comprises first semitransmissive mirror means located in the path of the light modulated by the image on the original and arranged to transmit part of the modulated light towards the copy bearer and to deflect the remainder of the modulated light towards the photoconductive surface of the vidicon, wherein said first light source comprises means for illuminating with first light all portions of the image on the original simultaneously and uniformly, and wherein said first light source, the image on the original and the copy bearer define a main optical light path, and wherein said cathode ray tube is located outside said main optical light path, and wherein said optical means comprises second semitransmissive mirror means arranged in said main path to bend the flying light beam derived from the flying spot of the cathode ray tube into said main optical path while transmitting to the original the light from said first light source.

13. An apparatus as defined in claim 9, wherein the filter of said second light source and the filter of said detecting means are polarization filters having polarization axes crossed relative to each other.

14. An apparatus as defined in claim 10, wherein the filter of said second light source and the filter of said detecting means are polarization filters having polarization axes crossed relative to each other.

15. An apparatus as defined in claim 9, wherein the filter of said second light source and the filter of said detecting means are color filers of complementary colors.

16. An apparatus as defined in claim 10, wherein the filter of said second light source and the filter of said detecting means are color filters of complementary colors.

17. An apparatus for scanning originals bearing pictorial images, and the like, and reproducing such images, comprising, in combination, illuminating means operative for illuminating an original with first and second light and projecting the image of the original onto a copy carrier; detecting means operative for detecting the spatial variation of the intensity of the first light after the first light has been modulated in intensity by the image on the original; and contrast-changing means operative for changing the contrast of the image projected onto the copy carrier compared to the contrast of the image on the original by changing the spatial distribution of the intensity of the second light in dependence upon the detected spatial variation of the intensity of the modulated first light, wherein said illuminating means comprises a cathode ray tube, scanning control means operative for causing the electron beam of the cathode ray tube to form on the image screen thereof a flying spot which traces a raster a first time and then a second time, and optical means for deriving from the flying spot a flying light beam and illuminating the image on the original with the flying light beam, the light of the beam constituting the first light and constituting the second light during the first and second tracings, respectively, wherein said detecting means comprises light registering means operative during the first tracing for registering the variation with respect to time of the intensity of the modulated light beam, and wherein said contrast-changing means comprises means operative during the second tracing for reading out the light registering means in synchronism with the second tracing and applying to the spot-brightness control input of the cathode ray tube a control signal derived from the output signal of the light registering means.

18. An apparatus as defined in claim 17, wherein said detecting means comprises means for deflecting a portion of the light of the flying light beam at a location where such light has been modulated in intensity by the image on the original, and wherein said light registering means is positioned in the path of the deflected light.

19. An apparatus for scanning originals bearing pictorial images, and the like, and reproducing such images, comprising, in combination, illuminating means operative for illuminating an original with first and second light and projecting the image of the original onto a copy carrier; detecting means operative for detecting the spatial variation of the intensity of the first light after the first light has been modulated in intensity by the image on the original; and contrast-changing means operative for changing the contrast of the image projected onto the copy carrier compared to the contrast of the image on the original by changing the spatial distribution of the intensity of the second light in dependence upon the detected spatial variation of the intensity of the modulated first light, wherein said illuminating means comprises a cathode ray tube, scanning control means operative for causing the electron beam of the cathode ray to form on the image screen thereof a flying spot which traces a raster comprised of first scan lines alternating with second scan lines, and optical means operative for deriving from the flying spot a flying light beam and illuminating the image on the original with the flying light beam, and wherein said detecting means comprises registering means operative during the tracing of each first scan line for registering the variation with respect to time of the intensity of the light beam as modulated by the image on the original, and wherein said contrast-changing means comprises brightness control means operative for applying to the spot-brightness control input of the cathode ray tube during the tracing of each first scan line a control signal which maintains the intensity of the flying light beam constant and during the tracing of each second scan line a control signal which varies in time in correspondence to the light beam intensity variation registered during the preceding tracing of a first scan line.

20. An apparatus as defined in claim 19, wherein said registering means comprises a photoelectric detector operative for generating an electrical signal having an instantaneous value indicative of the instantaneous intensity of the light incident upon the photoelectric detector and a time-delay device having an input connected to the output of the photoelectric detector and exhibiting a time delay equal to the time required for the tracing of one scan line, and wherein said brightness control means of said contrast-changing means comprises means operative during the tracing of each second scan line for applying to the spot-brightness control input of the cathode ray tube the output signal of said time delay device.

21. An apparatus as defined in claim 19, wherein said registering means comprises a photoelectric detector operative for generating an electrical signal having an instantaneous value indicative of the instantaneous intensity of the light incident upon the photoelectric detector and a time-delay device having an input connected to the output of the photoelectric detector and exhibiting a time delay equal to the time required for the tracing of one scan line, and wherein said brightness control means of said contrast-changing means comprises a D.C. voltage source and electronic switch means connecting the spot-brightness control input of the cathode ray tube to the output of the D.C. voltage source and to the output of the time-delay device and operative for applying to the spot-brightness control input the output voltage of the D.C. voltage source during the tracing of each first scan line and operative for applying to the spot-brightness control input the output signal of the time delay device during the tracing of each second scan line.

22. In a method of scanning originals bearing optical images, and the like, and reproducing such images, in combination, the steps of illuminating an original with first and second light and projecting the image of the original onto a copy carrier; detecting the spatial variation of the intensity of the first light after the first light has been modulated in intensity by the image on the original; and changing the contrast of the image projected onto the copy carrier compared to the contrast of the image on the original by changing the spatial variation of the intensity of the second light in dependence upon the detected spatial variation of the intensity of the modulated first light, wherein said step of illuminating an original comprises scanning the original with a flying light beam of substantially constant intensity derived from a flying light spot on the image screen of a cathode ray tube, the light of said flying light beam constituting said first light, wherein said step of detecting the intensity of the first light comprises deflecting a portion of the light of the flying light beam at a location where such light has been modulated in intensity by the image on the original and projecting such deflected light onto the light-sensitive surface of a storage device capable of registering the intensity value of such deflected light during the course of at least one complete scanning of the image on the original, and wherein said step of changing the contrast comprises thereafter again scanning the original with the flying light beam and during such scanning reading out the storage device in synchronism with such scanning and applying the output signal of the storage device to the spot-brightness control input of the cathode ray tube.

* * * * *